United States Patent [19]
Smith

[11] 3,767,000
[45] Oct. 23, 1973

[54] MOTORCYCLE WITH AUXILIARY WHEEL
[76] Inventor: Galen W. Smith, 1332 Inman St., Akron, Ohio
[22] Filed: Dec. 29, 1971
[21] Appl. No.: 213,358

[52] U.S. Cl.................. 180/16, 180/33, 280/150 A
[51] Int. Cl............................................ B60k 25/00
[58] Field of Search ................. 180/16, 15, 13, 33, 180/25, 30, 1 AW; 280/150 A

[56] References Cited
UNITED STATES PATENTS
| | | | |
|---|---|---|---|
| 1,636,997 | 7/1927 | Helmling............................. | 180/15 |
| 1,390,441 | 9/1921 | Jackson............................ | 180/33 R |
| 2,638,997 | 5/1953 | Kember................................ | 180/15 |

*Primary Examiner*—Gerald M. Forlenza
*Assistant Examiner*—John Mannix
*Attorney*—Vern L. Oldham et al.

[57] ABSTRACT

An auxiliary wheel is provided for a motorcycle and is carried in vertically adjustable relationship to the ground or support surface for the motorcycle. Suitable frame means support the wheel on the motorcycle and a drive or power system is provided for releasably engaging the conventional drive system of the cycle and connects to the wheel for driving the same when in road engaging position. The wheel will support the back portion of the motorcycle and permit its operation when the rear tire of the cycle is flat.

8 Claims, 5 Drawing Figures

PATENTED OCT 23 1973 3,767,000

INVENTOR.
GALEN W. SMITH
BY
OLDHAM & OLDHAM
ATTORNEYS

MOTORCYCLE WITH AUXILIARY WHEEL

A motorcycle having an auxiliary wheel is provided by the invention and with the wheel being usable to support the cycle for temporary transport action with the rear wheel of the cycle being inoperative at such time.

BACKGROUND OF INVENTION

When a motorcycle has a flat tire, normally appreciable difficulties are presented since no motorcycle normally carries a spare tire. Thus, the driver of the cycle must either repair the flat tire himself at the spot of the flat tire occurrence, or else the cycle must be otherwise transported to a repair area. Obviously, this presents appreciable difficulties and inconveniences.

The general object of the present invention is to provide an auxiliary wheel for a motorcycle and which wheel can be brought into engagement with a road support surface for temporary drive of the motorcycle when the rear tire of the cycle is flat or otherwise inoperative.

Another object of the invention is to provide an auxiliary support wheel in a motorcycle which auxiliary wheel can be driven from the conventional drive means of the cycle.

Another object of the invention is to provide an auxiliary support wheel with drive means which can be brought into and out of engagement with the conventional drive of the cycle and with the auxiliary wheel likewise being movable to and from road engaging positions.

A further object of the invention is to provide auxiliary mechanism that can be attached to conventional cycles and provide for temporary support of the cycle thereon and drive thereby when the rear tire of the cycle is incapacitated or flat, which apparatus can readily be attached to most cycles in existence today.

A further object of the invention is to provide a relatively inexpensive, but sturdy auxiliary wheel construction for a motorcycle for temporary load support and transport use.

The foregoing and other objects and advantages of the invention will be made more apparent as the specification proceeds.

Reference now is made to the accompanying drawings, wherein.

When referring to corresponding members shown in the drawing and referred to in the specification, corresponding numerals are used to facilitate comparison therebetween.

INVENTIVE SUBJECT MATTER

Figure 1:
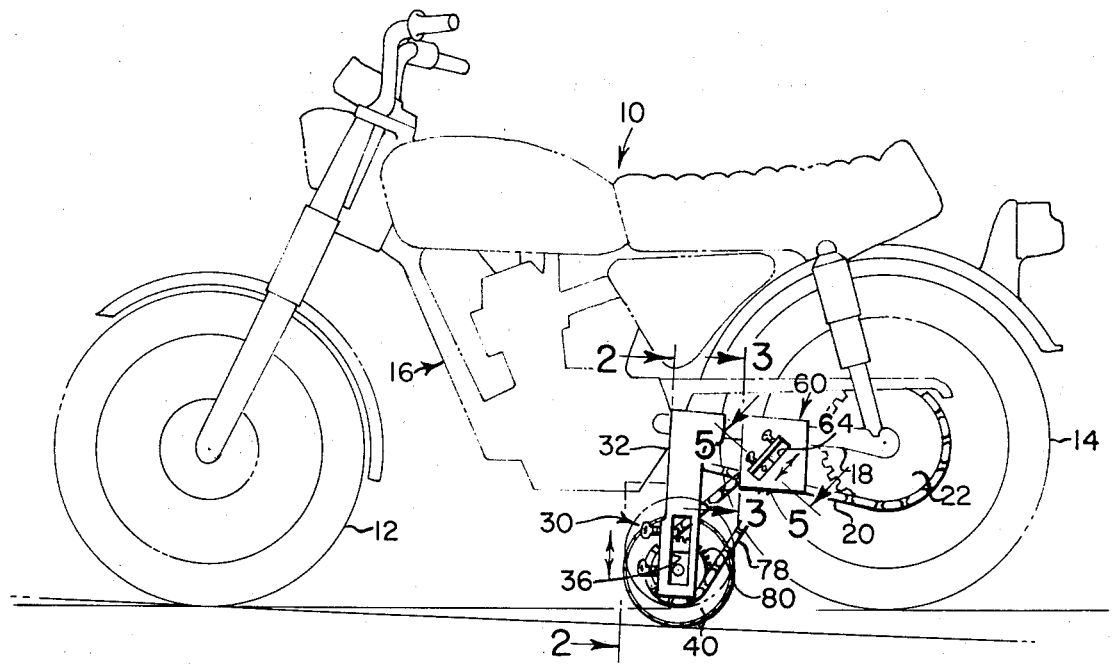
FIG. 1 is a phantom view of a motorcycle showing an embodiment of the auxiliary wheel of the invention secured thereto.
Figure 2:
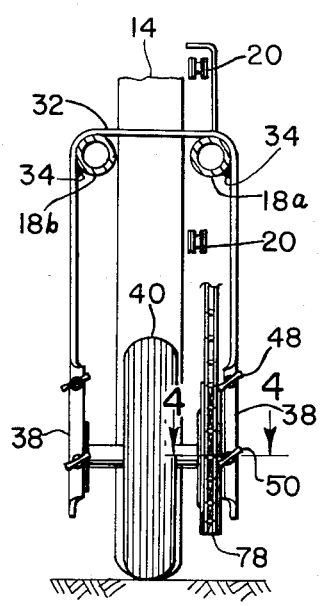
FIG. 2 is a fragmentary vertical section taken on line 2—2 of FIG. 1.
Figure 3:
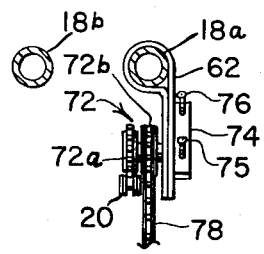
FIG. 3 is a fragmentary vertical section taken on line 3—3 of FIG. 1.
Figure 4:
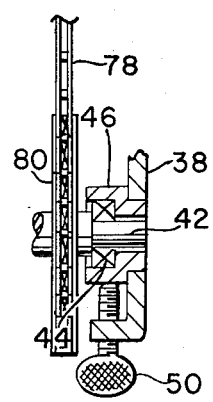
FIG. 4 is a fragmentary vertical section of the support means for the auxiliary wheel taken on line 4—4 of FIG. 2.

The present invention, as one embodiment thereof, relates to the improvement in motorcycles including a frame having a rearwardly extending support member and drive means including a chain extending rearwardly adjacent the support member to the rear wheel of the motorcycle, with a support frame secured to the support member and extending downwardly thereform, a wheel operatively journalled on the support frame adjacent the lower end thereof and movable vertically of the support frame to and from a fixed lower position in which it is in engagement with the ground. Releasable drive means operatively connect the chain to the wheel to drive the same when in its fixed lower position.

With reference to the details of the structure shown in the drawings, a motorcycle is indicated as a whole by the numeral 10. This motorcycle 10 includes a front wheel 12 and a rear wheel 14, each having conventional pneumatic tires thereon. The motorcycle includes a suitable frame 16 including a rearwardly extending support member 18, or fork which has two arms 18a and 18b positioned operatively on opposite lateral sides of the rear wheel 14 and positioning such wheel in a conventional manner. A drive chain 20 is shown in the drawings and this connects to the drive motor (not shown) of the motorcycle in a conventional manner for operatively connecting to and driving the rear wheel 14 by a sprocket 22 operatively connected thereto.

The feature of the invention resides in an auxiliary wheel assembly indicated as a whole by the numeral 30 which is carried by the motorcycle 10 and is adapted to be brought into use temporarily when the tire on the rear wheel 14 would be deflated or otherwise damaged whereby the motorcycle would be supported on the front wheel 12 and the auxiliary wheel assembly 30 and be driven through the auxiliary wheel assembly. A suitable support frame 32, of inverted U-shape, is suitably secured to the yoke arms 18a and 18b of the support member 18 immediately in front of the rear wheel 14, as by bolts or spot welds 34 and extends downwardly therefrom. This bracket or support frame 32 is formed from metal and a pair of opposed vertically extending slots 36 are provided in the lower ends of arms 38 of this support frame or bracket 32. Thus, a wheel 40 is journalled on and supported by and between the arms 38, as by being mounted on any conventional shaft 42 the ends of which can be engaged, for example, or be carried by bearings 44, one of which is received in each of a pair of mounting devices 46,46. These mounting devices snugly engage with and are held against rotation by the slots 36 to be vertically movable therealong as hereinafter described. The arms 38 of the support frame 32 have flanges thereon which carry a pair of set screws 48 and 50 at vertically spaced portions thereof. These set screws 48 and 50 are adapted to engage with a suitable recess provided in the mounting device or slide 46 or to bear on the slide 46 when at its upper or lower position, respectively, to retain the shaft and the auxiliary wheel 40 in a fixed position for load support action or for carrying the wheel in inoperative form, as desired.

Figure 5:
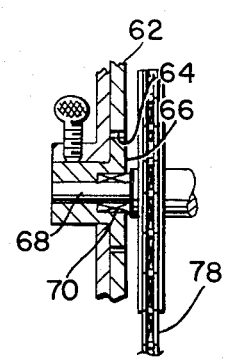
FIG. 5 is a fragmentary vertical section taken on line 5—5 of FIG. 1.

As another important portion of the auxiliary wheel assembly 30, a bearing means 60 is provided and this includes a mounting bracket 62 that is suitably secured, as by welding, to the support member 18 immediately adjacent the rear wheel sprocket 22 and such bracket extends downwardly from the support member. This bracket 62 in this instance is shown as provided with a diagonally extending slot 64 in which a bearing block 66 is operatively positioned. Thus, FIG. 5 shows that this bearing block will journal a shaft 68 therein as by means of a bearing 70. The shaft 68 is shown as positioning a double sprocket 72 thereon with one of the sprockets 72a being vertically aligned with and being movable to and from engagement with the drive chain 20, depending upon whether the bearing block 70 is in its lowered or elevated position, respectively. Again, a flanged portion 74 is provided on this bracket 62 and it mounts a pair of set screws 75 and 76 therein to engage with the bearing block 70 and retain this block in its elevated or lowered position, as desired. The second sprocket 72b of the double sprocket has a drive chain 78 engaged therewith and this drive chain normally operatively engages with a sprocket 80 carried by and secured to the shaft 42 on which the wheel 40 is mounted whereby when the sprocket 72b is engaged with the drive chain, drive is transmitted to the auxiliary wheel 40 when the motor of the motorcycle is operating. This will drive the motorcycle 10 by the auxiliary wheel 40 when it is in operative ground engaging position.

FIG. 1 of the drawings shows that the wheel 40 can be lowered to a position wherein it will engage the ground and it will at that time either take all of the load off of the rear wheel 14 or possibly elevate such wheel slightly above the ground depending on whether or not the tire is deflated. Thus, a safety device has been provided for a motorcycle for temporary operation thereof when a deflated or damaged rear wheel or tire or other accident to the support rear wheel occurs. In case of a flat front tire, the auxiliary wheel could be used to relieve load on the front wheel by varying the position of the rider on the motorcycle seat. Or possibly the auxiliary wheel could be shifted forwardly slightly on the cycle frame. The rider, by shifting his weight on the seat, can aid in the support action of the auxiliary wheel. Hence, it is believed that the objects of the invention have been achieved.

While one complete embodiment of the invention has been disclosed herein, it will be appreciated that modification of this particular embodiment of the invention may be resorted to without departing from the scope of the invention.

What is claimed is:

1. In combination, a motorcycle including a front wheel, a rear wheel, a frame having a rearwardly extending support member, and drive means including a driven chain extending rearwardly adjacent the support member, with a support frame secured to said support member and extending downwardly therefrom adjacent said rear wheel, an auxiliary wheel operatively journalled on said support frame and movable vertically thereof to and from a fixed lower position, a bearing means carried by said support member, sprocket and shaft means journalled in said bearing means with said sprocket being engageable with said drive chain, drive means operatively connecting said sprocket to said auxiliary wheel which is in operative ground engagement and in a load support position adjacent said rear wheel at its said lower position; and said support frame being of inverted U-shape, said auxiliary wheel carries a tire and is received between arms of said support frame, and a shaft for said auxiliary wheel is supported by said arms.

2. A combination as in claim 1 where said wheel in its said lower position has its lower peripheral surface at or below the support surface of said rear wheel.

3. A combination as in claim 1 where said auxiliary wheel is adjacent a rear wheel of the cycle and removes load therefrom when the auxiliary wheel is in its lowered position, the auxiliary wheel position being suitably controlled in position in either an upper or lower position.

4. A combination as in claim 3 where load on the front wheel can be removed by the auxiliary wheel and by the rider moving rearwardly of the cycle seat.

5. In combination, a motorcycle including a frame having a rearwardly extending support member, a front wheel, a rear wheel and drive means including a driven chain extending rearwardly adjacent the support member, and characterized by a support frame secured to said support member and extending downwardly therefrom, a wheel journalled on said support frame and movable vertically thereof between fixed upper and lower positions, a bearing means operatively carried by said support member and vertically movable between fixed upper and lower positions, a double sprocket and shaft means journalled in said bearing means with one sprocket being movable to and from operative engagement with said driven chain, and a chain operatively connecting said wheel to the second sprocket of said double sprocket to drive said wheel when said one sprocket engages said driven chain, said wheel being in ground engagement and load support position at its said lower position.

6. A combination as in claim 5 where said wheel is carried by a shaft secured to a support block, said support block slidably engaging said support frame for controlled vertical movement.

7. A combination as in claim 5 where said bearing means has controlled sliding movement in a bracket secured to said support member.

8. A combination as in claim 5 where the extent of movement of said wheel and said bearing means are correlated and said chain operatively engages said sprockets at all times.

* * * * *